United States Patent
Proulx et al.

(10) Patent No.: US 7,085,277 B1
(45) Date of Patent: Aug. 1, 2006

(54) SERVICE MANAGEMENT OF MULTIPLE INDEPENDENT FORWARDING REALMS

(75) Inventors: Denis Proulx, Kanata (CA); Angelica Kasvand, Kanata (CA); Ron Bolder, Nepean (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/165,735

(22) Filed: Oct. 5, 1998

(30) Foreign Application Priority Data

Mar. 10, 1997 (CA) .................................... 2217315

(51) Int. Cl.
*H04L 12/56* (2006.01)

(52) U.S. Cl. .................. 370/395.53; 709/223; 709/224

(58) Field of Classification Search ................ 370/395, 370/256, 257, 396, 401, 404, 389, 392, 395.53, 370/395.6; 709/220, 221, 222, 223, 224, 709/225, 226, 200, 204, 208, 311, 249; 713/164, 713/165, 166, 167, 150, 151, 155, 168, 182, 713/189, 200, 201; 707/100, 103, 103 Y See application file for complete search history.

(56) References Cited

U.S. PATENT DOCUMENTS

| | | | | |
|---|---|---|---|---|
| 5,398,242 A | * | 3/1995 | Perlman | 370/256 |
| 5,442,791 A | * | 8/1995 | Wrabetz et al. | 709/330 |
| 5,485,455 A | * | 1/1996 | Dobbins et al. | 370/255 |
| 5,600,644 A | * | 2/1997 | Chang et al. | 370/404 |
| 5,617,540 A | * | 4/1997 | Civanlar et al. | 370/395.54 |
| 5,684,800 A | * | 11/1997 | Dobbins et al. | 370/401 |
| 5,818,842 A | * | 10/1998 | Burwell et al. | 370/397 |
| 5,819,042 A | * | 10/1998 | Hansen | 709/222 |
| 5,892,764 A | * | 4/1999 | Riemann et al. | 370/401 |
| 5,909,441 A | * | 6/1999 | Alexander et al. | 370/395.54 |
| 5,915,001 A | * | 6/1999 | Uppaluru | 379/88.22 |
| 5,917,825 A | * | 6/1999 | Cohen | 370/401 |
| 5,920,542 A | * | 7/1999 | Henderson | 370/217 |
| 5,940,591 A | * | 8/1999 | Boyle et al. | 713/201 |
| 5,946,311 A | * | 8/1999 | Alexander, Jr. et al. | 370/395 |
| 5,949,783 A | * | 9/1999 | Husak et al. | 370/396 |
| 5,963,556 A | * | 10/1999 | Varghese et al. | 370/401 |
| 6,032,184 A | * | 2/2000 | Cogger et al. | 709/223 |
| 6,035,105 A | * | 3/2000 | McCloghrie et al. | 709/236 |
| 6,047,320 A | * | 4/2000 | Tezuka et al. | 709/223 |
| 6,058,429 A | * | 5/2000 | Ames et al. | 709/242 |
| 6,081,836 A | * | 6/2000 | Karapetkov et al. | 709/218 |
| 6,085,238 A | * | 7/2000 | Yuasa et al. | 370/409 |
| 6,157,647 A | * | 12/2000 | Husak | 370/401 |
| 6,158,007 A | * | 12/2000 | Moreh et al. | 713/201 |
| 6,212,191 B1 | * | 4/2001 | Alexander et al. | 370/401 |
| 6,311,218 B1 | * | 10/2001 | Jain et al. | 709/229 |

\* cited by examiner

*Primary Examiner*—Chi Pham
*Assistant Examiner*—Phuc Tran
(74) *Attorney, Agent, or Firm*—Marks & Clerk; S. Mark Budd (57) ABSTRACT

A method of administratively dividing an emulated local area network (LANE) into multiple independent forwarding realms thereby restricting the connectivity of a particular local area network (LAN) to other LANs. The method also introduces the ability of allocating a number of forwarding realms to a service user (Customer).

13 Claims, 11 Drawing Sheets

SERVICE MANAGEMENT OF MULTIPLE INDEPENDENT FORWARDING REALMS

FIELD OF THE INVENTION

This invention relates to emulated local area network (ELAN) systems and more particularly to a network management platform that supports the division of a communication network into independent forwarding realms having restricted connectivity.

BACKGROUND

Local area network emulated (LANE) networks have, as a basic requirement, the ability to associate local area network (LAN) ports with virtual networks. These basic requirements are set out in the ATM Forum's LAN emulation over ATM version 1.0 of January 1995. These virtual networks do not provide any restrictions as to the forwarding of packets. This allows any port in the network to forward packets to any other port in the system. As a consequence, the system is not well-suited for private Intranet service.

SUMMARY OF INVENTION

It is an objective of the present invention to introduce the concept of administratively dividing a communication network into multiple independent forwarding realms effectively restricting the connectivity of a particular port to other ports in different forwarding realms. It also introduces the ability of allocating a number of realms to a service user or customer.

Therefore, in accordance with the present invention there is provided a method of restricting packet transport through a local area network emulation (LANE) network to specific local area network customers, the method comprising: creating a customer object (VSN) for each of the customers, the customer objects having assigned thereto a portion of the LANE network (physical Ports: SI, AI are assigned to a customer); creating at least one forwarding service object (Realm: VPN or PI); and allocating the forwarding service object to the specific local area network customer (Realm binding to Customer); and creating/binding the internetworking service objects (CSI ISM objects: VLAN/VSubnet/Subnet, SIG, SI) to the realm for providing the specific forwarding feature (Bridging and/or Routing or Public Internet)required in the LANE network for a given customer.

BRIEF DESCRIPTION OF THE DRAWINGS

The invention will now be described in greater detail having reference to the attached drawings wherein.

DETAILED DESCRIPTION OF THE INVENTION

The present invention relates to a Carrier Scale Internetworking (CSI) implementation in which a network such as an asynchronous transfer mode (ATM) network is divided into individual realms, each realm representing an instance of a virtual private network (VPN) or a Public Internet connectivity. Canadian patent application serial number 2,217,275, filed Oct. 3, 1997 and assigned to Newbridge Networks Corporation, provides additional details respecting multiple realms in an internetworking environment. The contents of the referenced Canadian application are incorporated herein by reference.

Figure 1:
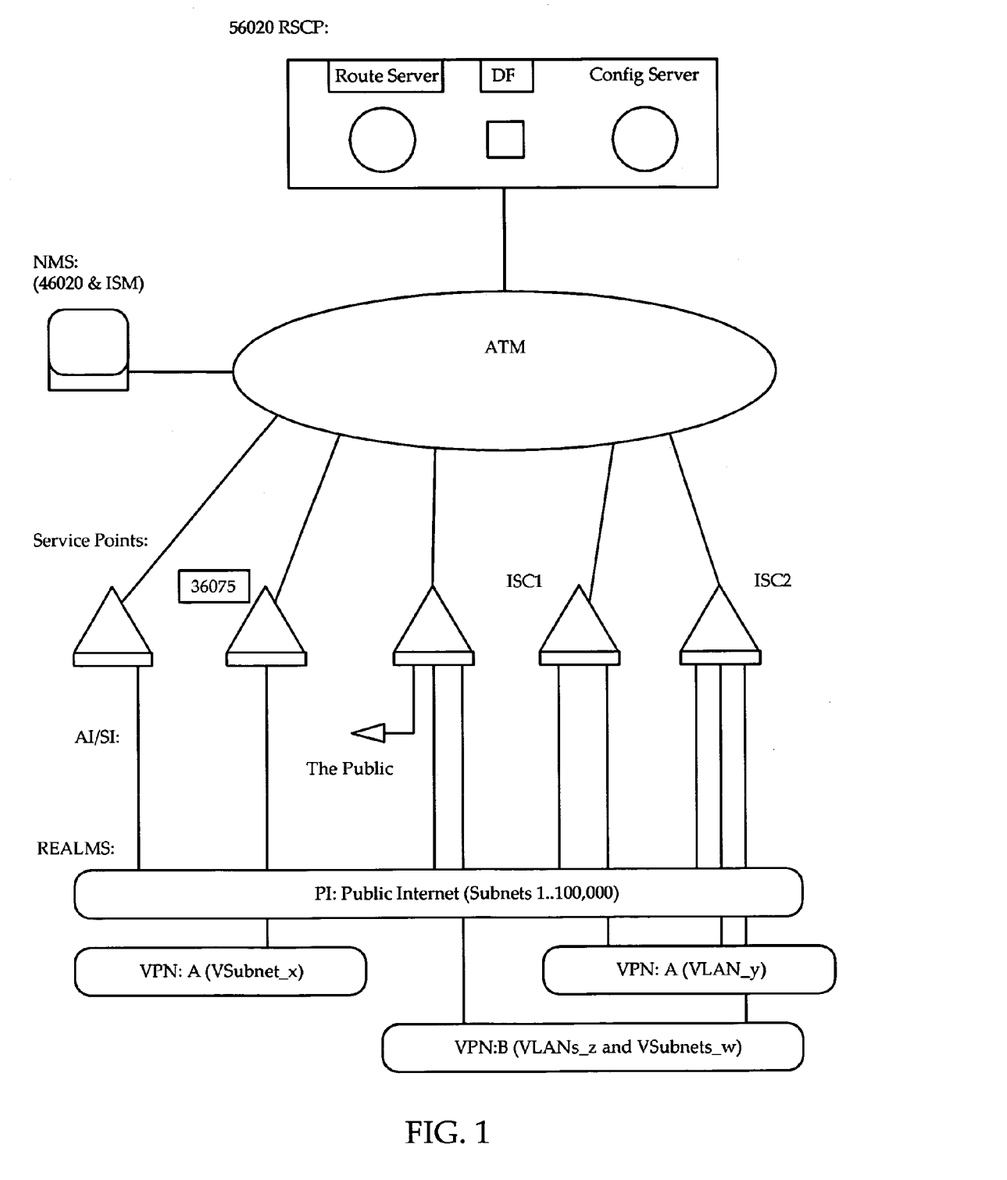
FIG. 1 is an architectural view of one implementation of the invention.

An architectural view of a CSI system is illustrated in FIG. 1. FIG. 1 shows the various system components including the ATM network, Configuration Server, Route Servers, network management system (NMS), Service Points (Internetworking Service Cards (ISC), Ridges) and the internetworking services supported by the system (Realm). The internetworking services include Public Internet connectivity (PI), routed subnets through VPN A (VSubnet_x) and VPN B (VSubnet_w), and bridged VLANs through VPN A (VLAN_y). These are three examples of the internetworking service that a carrier may provide to customers through the CSI system. As identified in FIG. 1 these internetworking services are referred to as Realms.

Figure 2:
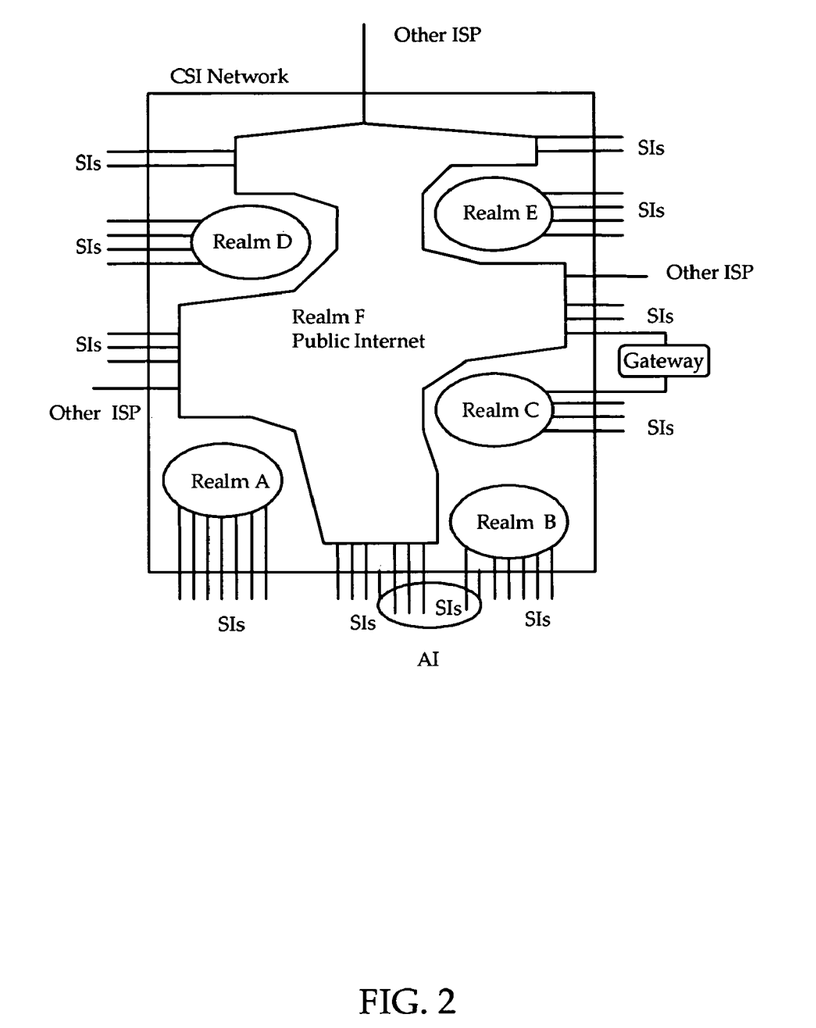
FIG. 2 is a Service View from Realm to Service Interfaces (SIs) Ports.

A simple CSI Service view is shown in FIG. 2. The figure contains the two types of services, Realms A to E are VPNs services and Realm F is the Public Internet service. The Realms are associated to the service interface (SI) PORTS of the CSI System.

Figure 3:
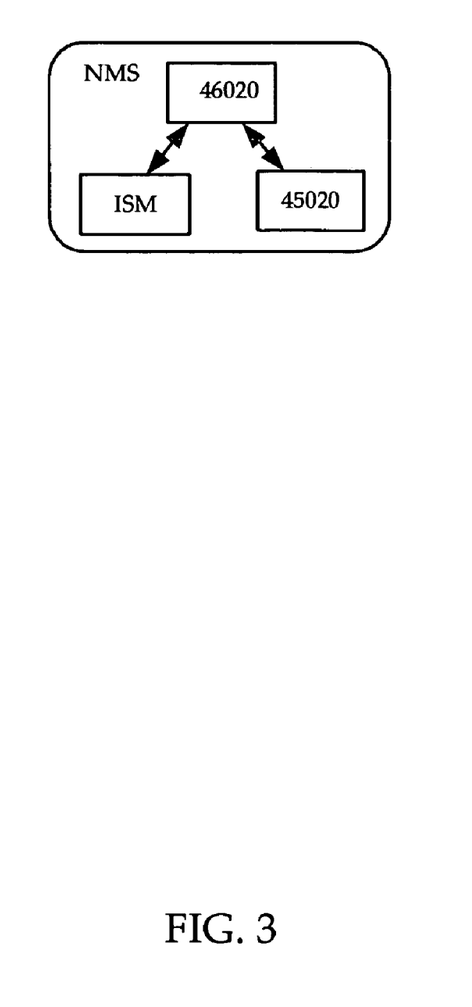
FIG. 3 show the network management components.

The following is a description of terms which relate to the CSI and which may be new:

NMS Platform: The Network Management System (NMS). The NMS consists of three components which are illustrated in FIG. 3; a network manager, such as Newbridge Networks' MainStreetXpress 46020 and known herein as a 46020; an element manager, such as Newbridge Networks' MainStreetXpress 45020 and known herein as a 45020 both of which primarily provide physical management of equipment and layer 2 paths; and the Internetworking Service Manager (ISM) which primarily provides Internetworking Service management for the CSI system. All three cooperatively work together, such that the user is presented with what looks like a single unified NMS Graphical User Interface (GUI). Customers (VSN), Access Interfaces (AIs) and Service Interfaces (SIs) objects are managed from the 46020 physical management component. Realms, VLANs, Vsubnet, Subnet and SIGroups are managed by the Internetworking Service Manager (ISM) management component.

A platform such as a Newbridge MainStreetXpress 56020 (known herein as a 56020) is the platform upon which the Route Server (RS) and the Config Server (CONS) reside. Also called the Routing Service Control Box (RSCP). Only one 56020 contains the CONS in a CSI system. All other 56020s are Route Servers only and are labeled as Logical Route Servers in the NMS GUI interface. Logical Route Servers (LRS) is the configuration set that is instantiated on a Route Server.

Route Server: Route Servers (RS) or (LRS) provide an essential part of switched routing in the CSI system, namely route calculation and route distribution. Together with Service Points (ISC cards, Ridge) they provide routing services for customer devices connected to the CSI system. There are many RSs in a CSI system.

CONS: The config server for Route Servers. The CONS' primary function within CSI is to act as first point of contact to other CSI components (Service Points: ISC card, ridges) and provide configuration download and updates to them. The NMS configures simultaneously both the CONS and the RSs when a Realm configuration is modified. There is only one CONS in the CSI system.

Service Points: In the CSI system, the Service Points (ISC card, ridge) refers to the components of the CSI system that perform the layer 3 Service Points function. (e.g. ISC card, Ridge).

Service Provider: In the CSI system, the service provider is the network administrator. The service provider is a user of the NMS GUI and has privilege to the creation/deletion/modification of the customer virtual service network (VSN). The service provider in the ISM has more privilege that the customer but operates in the same manner. The Service Provider owns the Public Internet Realm and can become a Customer by switching to a specific customer (VSN) and modifying the configuration.

Customer: In the CSI system, a customer is the owner of one or more Realms. Within the 46020 a Customer corresponds to a VSN. The ISM divides the customer's (VSN) equipment logically into Realms. Within the Realms internetworking service objects are created and bounded together to provide forwarding services for the customer.

VSN: Virtual Service Network. A customer's partition created in the 46020 where physical equipment is selected and given to a particular customer. A VSN is a Customer in the CSI system. The 46020 VSN provides to the ISM the Customer scope and the Port (SI) available to provide forwarding services.

Realm: The CSI System allows two types of Realms, VPN (Virtual Private Network) and PI (Public Internet). The VPN Realm can provide Bridged Services (VLAN) and/or Routed Services (VSubnet). The Public Internet Realm provides Internet Services (Subnet). The CSI system restricts the connectivity between Realms.

VPN: Virtual Private Network Realm. A VPN can have one or more VLAN's (Bridged Services) and/or Virtual Subnets (Routed Services) associated to it. A VPN restricts connectivity to other Realms.

VLAN: Bridged VLAN is a way of providing Bridged service in a VPN. A Bridged VLAN belongs to a VPN and supports multiple protocols. A Bridged VLAN operates over a set of Service Interface Groups.

VSubnet: A Virtual Subnet (VSubnet) is a way of providing Routed service in a VPN. A Virtual Subnet belongs to a VPN and supports Internet Protocol (IP). A Virtual Subnet can be configured to operate on one or more Service Interface Groups. The Virtual subnet corresponds to one IP subnet.

PI: Public Internet access Realm. A PI can have one or more Subnet Groups and IP Subnets associated to it to provide Internet Services. A Subnet Group can be configured to operate on one or more Subnets. A Subnet can be configured to operate on one SI.

Subnet Group: A collection of IP Subnets. Only user for the PI Realm.

Subnets: IP subnets for the PI Realm. Provides the IP interface to one IP subnet. An IP Subnet can be configured to operate on one Service Interface.

AI: Access Interfaces are the physical interfaces that are used to deliver one or more internetworking Service Interfaces between the customer and CSI system (e.g. T1 Frame Relay interface, STM1 UNI interface, 10BaseT interface, etc.).

Internetworking Services: Internet connectivity (Subnets), bridged VLANs and routed subnets (VSubnet) are three examples of internetworking services that a carrier (Service Provider) may provide to customers through the CSI system.

SI: Service interfaces Ports are the logical interfaces through which internetworking services are provided to the customers. Frame Relay VCs, ATM VCCs, PPP links, 10/100 Ethernets, 802.1Q explicitly-tagged VLANs, and FDDI LANs are examples of service interfaces to be supported by CSI. The 46020 connects physical interfaces (AI) to service interfaces (SI) in some cases and in other cases SI map directly to ports.

SIG: A Service Interface Group (SIG) is simply a collection of Service Interfaces.

Service management in a CSI system is provided by a network management platform (NMS). The users of this NMS in a CSI network are the Service Provider (Network Administrator) or the service users (CUSTOMER).

The network administrator uses a network management Graphical User Interface (NMS GUI) to control the configuration of the network. When an administrator wishes to divide the communication network into multiple independent scopes, the administrator creates a CUSTOMER object (VSN) for each customer that will be allocated a portion of the network. The administrator then creates a REALM object for each independent forwarding realm required in the network. The REALMS are allocated to customers. Initially, the REALM object is empty.

When a physical entity (Service Point e.g. ISC switch card, ridge) containing Ports (SIs) announces its existence, a PORT (SI) object representing each Port (SI) on the physical entity is automatically created. These Ports (SI) are displayed on the NMS GUI. Throughout this description Ports are Service Interfaces (SIs).

The administrator partitions the Ports (SI) to the customers (VSN). This makes the Ports (SI) automatically available for the Customer (VSN) and the Realm services creations.

The administrator can assign the Ports (SI) to SIGroups for ease of configuration.

The administrator defines the set of Ports (SI) that comprise a virtual network by creating a VNET object (VLAN, VSubnet, Subnet) for each virtual network. The Administrator can describe the VNET as being a routed VNET (VSubnet) or a bridged VNET (VLAN) or a routed subnet (Subnet) use for Public Internet only. The administrator can proceed to identify additional configuration information about the VNET which is necessary for the operation of the network. Once the VNET is configured, the administrator assigns Ports (SI) to be members of a VNET by binding the VNET to SIG.

The act of creating VNETs automatically binds the VNETs into the selected REALM. Ports (SI) in a REALM may only communicate with other Ports (SI) in the same REALM. This restriction is implemented using a Route Server component of a network. The Route Server is only told about Ports (SI) in the REALM for which it is providing route calculation.

In FIG. 3, the NMS provides the focus for simple, reliable and highly scaleable management of CSI services, networks and elements. The 46020 and 45020 graphical user interfaces (GUI) focus on physical network management while the CSI Internetworking Services Manager (ISM) provides logical network management and works cooperatively with the 46020 such that the user is presented with what looks like a single unified GUI.

In a CSI implementation several internetworking rules are enforced by the NMS namely:

A CSI system can have multiple Realms.
A Realm name is unique to the CSI System.
VLAN/VSubnet/Subnet name are unique to the Realm.
A Service Point can belong to multiple Realms.
A Service Point can belong to only one RS in a particular Realm.
A VPN is unique within the CSI System.
A VPN belongs to only one Customer. A Customer can create 0 to N VPNs.
A VPN can span multiple Route Servers but a Route Server can only have one VPN. (See FIG. 6 where the RS1 and RS2 owns VPN_7, and RS3 and RS4 owns VPN_8.)
All the VPN objects (VLAN, VSubnets, SIG, SI) cannot be shared with other Customers (VSN's).
There is only one Public Internet Realm in CSI.
Layer three service priority CoS (Class of Service) is configured for each Realm (VPN & PI).
A host is admitted into a routed or bridged VNET provided it communicates with the protocol configured on the VNET.
A host is admitted into a VSubnet/Subnet if the host is configured to match the Subnet IP adress.
A VLAN offers bridging capability to all of its ports (SI) bound to it. All ports (SI) within the same VLAN can communicate to each other provided the host meets the protocol admission rule.
A VLAN is created with a default of 11 protocols enabled. The Customer can create a VLAN with 1 to 11 protocols enabled. The following protocols are supported IP, IPX, Decnet, Appletalk, CLNP, VINES, XNS, SNA, NetBios, LAT, Other.
A Customer can create 0 to N VLANS.
A VLAN/VSubnet/Subnet are created with a unique identifier per Realm.
A VSubnet is created with one IP interface subnet.
SI bounded to a Vsubnet can communicate to all other Vsubnet within the specific Realm. Routing protocols are used to transverse Route Servers within the same Realm. These SIs cannot communicate to other SIs bounded to the other Realm.
A Customer can create 0 to N VSubnet.
A Customer can create 0 to N SIGroups.
A VSubnet/SIG/SI have a SI Class (ATM, ISC, Ethernet) for allowing ease of configuration.
Within a VPN, an SIGroup can contain 0 to N Service Interfaces of the same SI class.
A SI may belong to one SIGroup only.
A SIGroup may belong to several Vsubnets provided the Vsubnets are all on the same VPN and Route Server. This is known as multinetting SIs.
A SIGroup may belong to several VLANs provided no two of the VLANs have the same protocol enable and the VLANs are all on the same VPN and Route Server.

Deletion of a VLAN/VSubnets causes all SIGroups in the VLAN/VSubnet to be unbounded and service is removed.
Deletion of a SIGroup causes all VLAN/VSubnet and SI binding to the given SIGroup to be removed and therefore removing connectivity.
VLANs have no SI Class defined meaning any SIGroup type can be bounded to it.
Vsubnets have a SI Class of either (ISC, Ethernet, ATM) to allow binding or disallowing binding of SIGroups and to provided compatibility.
Four types of VSubnets are supported in the ISM; DistNumbered, NonDistNumbered, NonDistUnNumbered and Next Hop Resolution Protocol (NHRP).
NHRP Vsubnets require a Peer LRS address. NHRP Vsubnets cannot be bounded to SIGroup and the SI Class is set to N/A.
Numbered VSubnets require configuration of the IP Address, Mask, Broadcast.
UnNumbered VSubnets don't allow configuration of the IP Address, Mask, Broadcast.
VSubnets with a SI Class of Ethernet or ISC must have an encapsulation type of DIX-Ethernet or 802.3. VSubnets with a SI Class of ATM must have an encapsulation type of ATM.
UnNumbered VSubnets must have a SI Class of ISC, and a 46020 defined encapsulation of PPP-Null or PPP-LLC/SNAP.
Deletion of a VSubnet causes all SIGroups in the VSubnet to be unbound.
VSubnets will be created with a unique identifier per Realm.

The following ISM bind rules exist between VNET (VLANs/VSubnet/Subnets) and SIGroups:

Rule 1: VLANS are set to a DistNumbered connection type and establish the following bind rules:
1. VLANs don't have an SI Class, therefore SIs of any SI Class can be bound to it.
2. Multinetting is permitted as long as the VLANs don't share a protocol.

Rule 2: VSubnet set to a NHRP connection type establish the following bind rules:
1. No SI or SIG can be bound to the Vsubnet.

Rule 3: VSubnet set to a DistNumbered connection type establish the following bind rules:
1. Only SIs and SIGroups with the same SI Class as the VSubnet may be bound to the DistNumbered VSubnet.
2. Multinetting is permitted as long as the DistNumbered VSubnets have the same SI Class.

Rule 4: VSubnet set to a NonDistNumbered connection type establish the following bind rules:
1. Only a single SIGroup and SI can be bound to NonDistNumbered Vsubnet.
2. Multinetting is permitted as long as the NonDistNumbered VSubnets have the same SI Class.

Rule 5: VSubnet set to a NonDistUnNumbered connection type establish the following bind rules:
1. Only a single SIGroup and SI can be bound to NonDistUnNumbered Vsubnet.
2. Only a PPP type SI can be bound to NonDistUnNumbered Vsubnet (PPP type SIs are SI Class of ISC, and a 46020 defined encapsulation of PPP-Null or PPP-LLC/SNAP). The user can obtain the list from the list Vsubnet window and set the SI Class to ISC and the display criteria to PPP.
3. Multinetting is not permitted.

Figure 4:
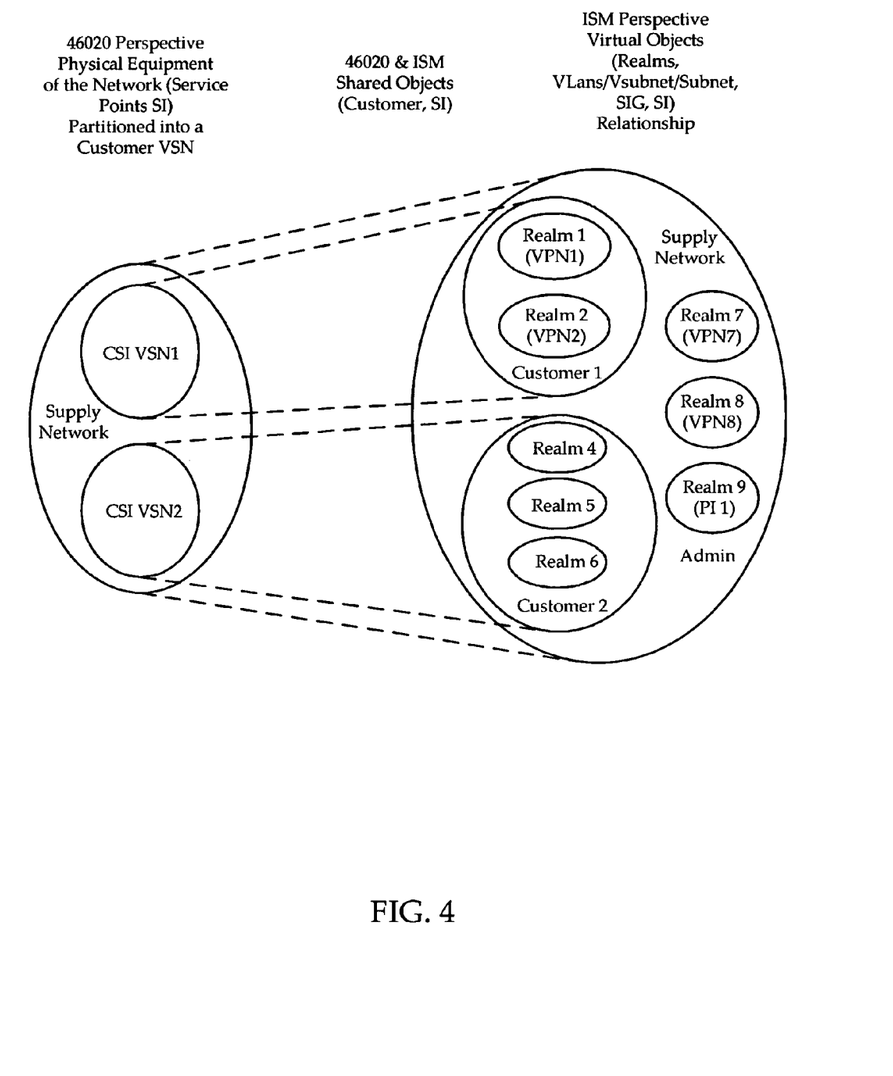
FIG. 4 illustrates the Customer (VSN) and Service Provider (Administrator) partitioning to Realm Perspective.
Figure 6:
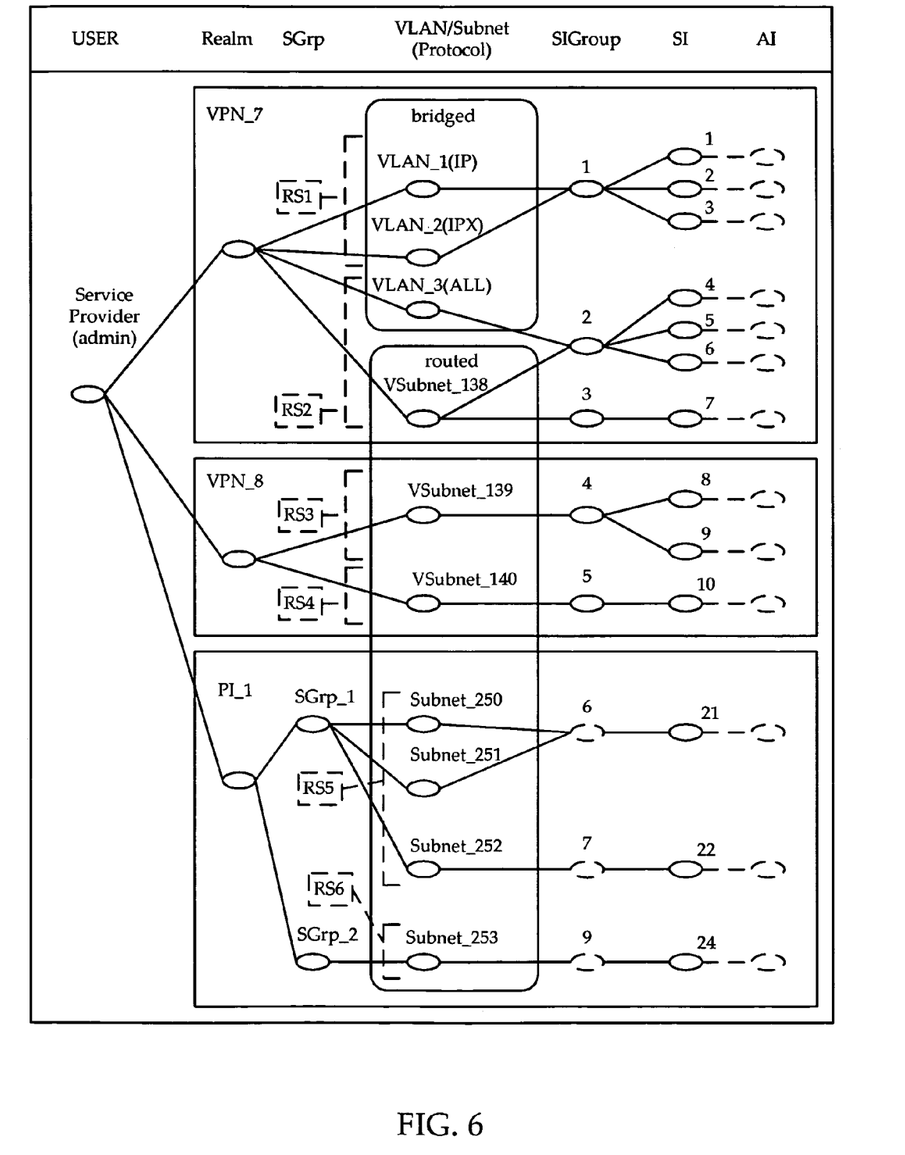
FIG. 6 illustrates service objects allocated to the Service Provider (administrator)
Figure 7:
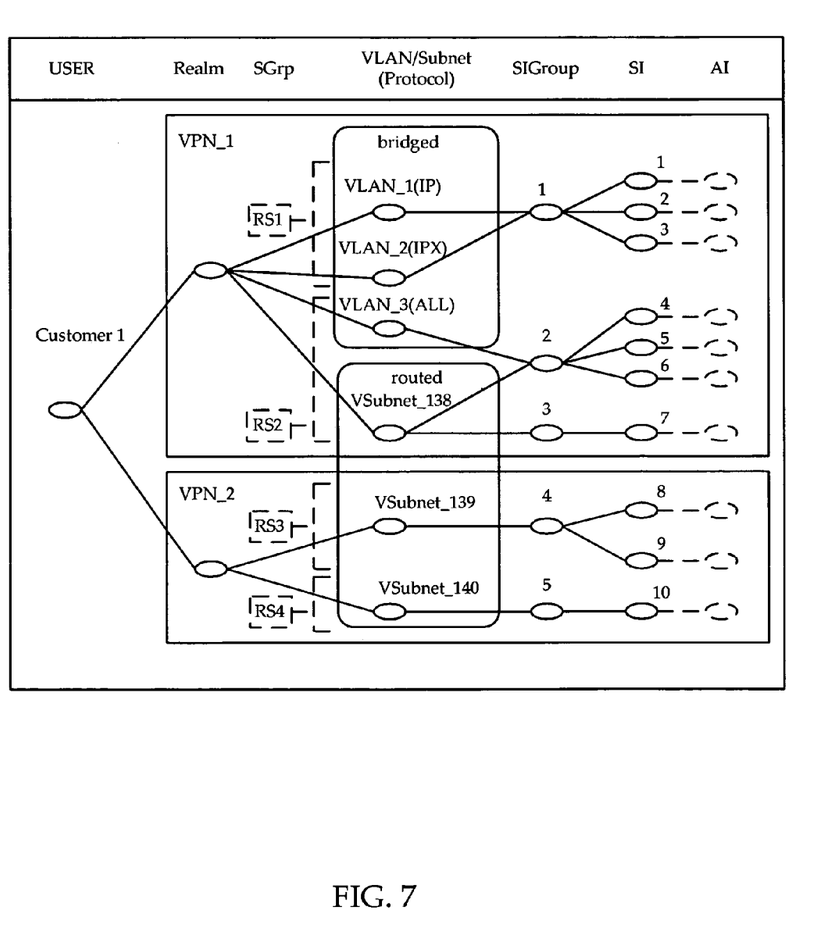
FIG. 7 illustrates service objects allocated to the Customer.

FIG. 4 illustrates an example of the CSI System Realm division, FIG. 6 illustrates a Service Provider view of this System, and FIG. 7 illustrates the Customer view of this System. By looking at the 3 figures one can picture better the administrative view of the NMS to manage such a system.

FIG. 4 shows the network management VSN partitioning relationship to Realms and the NMS User perceptive. There are two types of NMS users, the Service Provider (administrator) and the Customer. Each one has a different scope of operation.

The Service Provider (Administrator of the Network) has access to all the un-partitioned equipment (Supply Network, this is the equipment not part of a VSN) and can create his/hers own Realms using this equipment. FIG. 4 illustrates a Service Provider which owns Realm 7, Realm 8 and Reaml_9. The Service Provider creates the Customer and therefore has access to the VSN scope for modification. In order to modify such a VSN the Service Provider would switch to the Customer view. For example, if the Administrator would switch to Customer 1 view then he/she could managed the Realm_1 and Realm_2 forwarding services.

The Public Internet Realm is only owned by the Service Provider.

The Customer can only modify or view services with the physical equipment part of the VSN and the Realms within the VSN allocated to him/her. Therefore Customer 1 would only have access to the VSN1 objects which includes Realm 1 and Realm 2. Customer 2 would only have access to Realm 4, Realm 5 and Realm 6.

Figure 5:
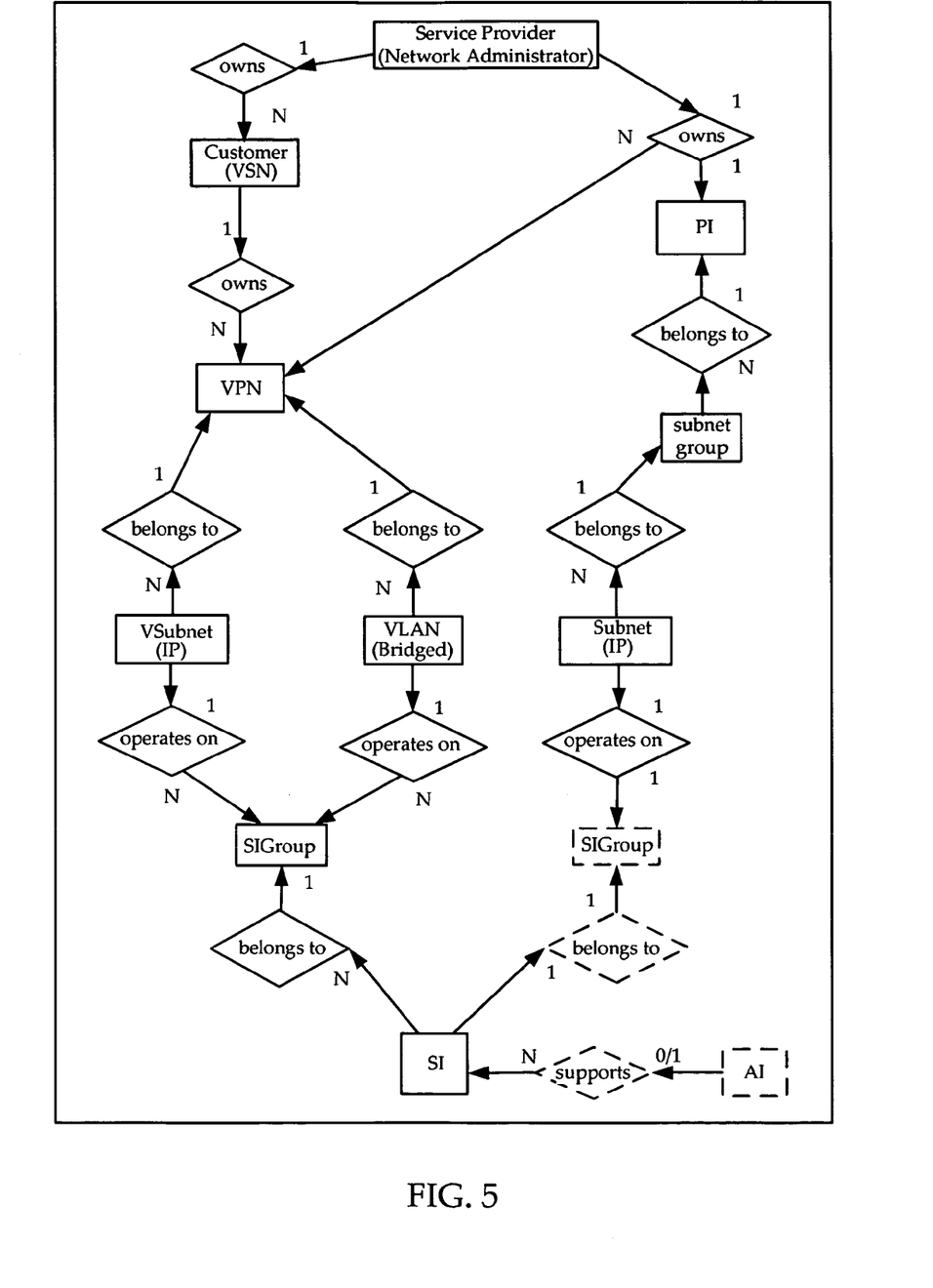
FIG. 5 is a network management services object model.

FIG. 5 is a network management internetworking service object model for the CSI system. The rectangles represent the NMS objects for creating these forwarding services. The diamonds represent the relationship between the objects. The CSI system supports two types of users as represented by the rectangles (Service Provider) and Customer. The CSI network can support multiple instances of the virtual private network (VPN) services over a variety of service interfaces (SI). These virtual private networks belong to the service provider and can be individually accessed by the customer. Public Internet (PI) access allows the service provider to offer access to the Public Internet over traditional LAN Port interfaces such as 100BaseT ethernet and FDDI. FIG. 5 illustrates a Service Provider owning 1 to N Customers owning 1 to N VPNs. A VPN contains 1 to N Vsubnet and VLANs depending on the type of service required. The VLANS and Vsubnet operate on 1 to N SIGroups and SIGroups belong to 1 to N SIs. The SIs can be connected to 0 to 1 physical interface (AI). Once the objects have been bounded together from Realm to SI then connectivity is provided.

FIG. 6 is an illustration of the CSI Service Provider (Administrator) network management service model object relationship wherein admin has three realms. This figure is similar to FIG. 4 but in more details as to how the NMS objects have been bounded together to provide some forwarding services for the Service Provider. Note: that these services are only for the Service Provider and not for the customer. The circles represent the objects, the titles represents the object type as per a column view. The RS1 to RSx represent the Route Server holding the configuration data. RS1 contains all the configuration for VPN_7: VLAN 1, VLAN 2, VLAN 3, SIGroup 1, SI 1 2 3. The Route Server RS 2 contains all the configuration for Vsubnet_138, SIGroup 3 and SI 7. VPN_7 spans two Route Servers RS1 and RS2, and VPN_8 spans RS3 and RS4. It is the responsibility of the NMS application to make this configuration span the RSs and also update the CONS.

The VPN_7 Realm provides two types of service namely bridging (IP, IPX, All protocol) and routing (IP); VPN_8 provides routing only (On 2 IP Virtual Subnets interface) and PI_1 provides Public Internet access on more than one IP Subnet interface.

Service Interfaces (SI) and Access Interface (AI) are dealt out to customers through the 46020 VSN partitioning. The 46020 provides connectivity from AI to SI. The ISM is used to create the connectivity from SIs to Realm.

FIG. 7 is an illustration of the CSI Customer network management service model object relationship. A CSI Customer cannot view or modify the Public Internet Realm. This view can also be seen by the Service Provider if he/she switches to the Customer view therefore becoming the Customer. The Customer can only modify his/hers services by moving objects around within his/hers scope of view (partitioned).

Figure 8:
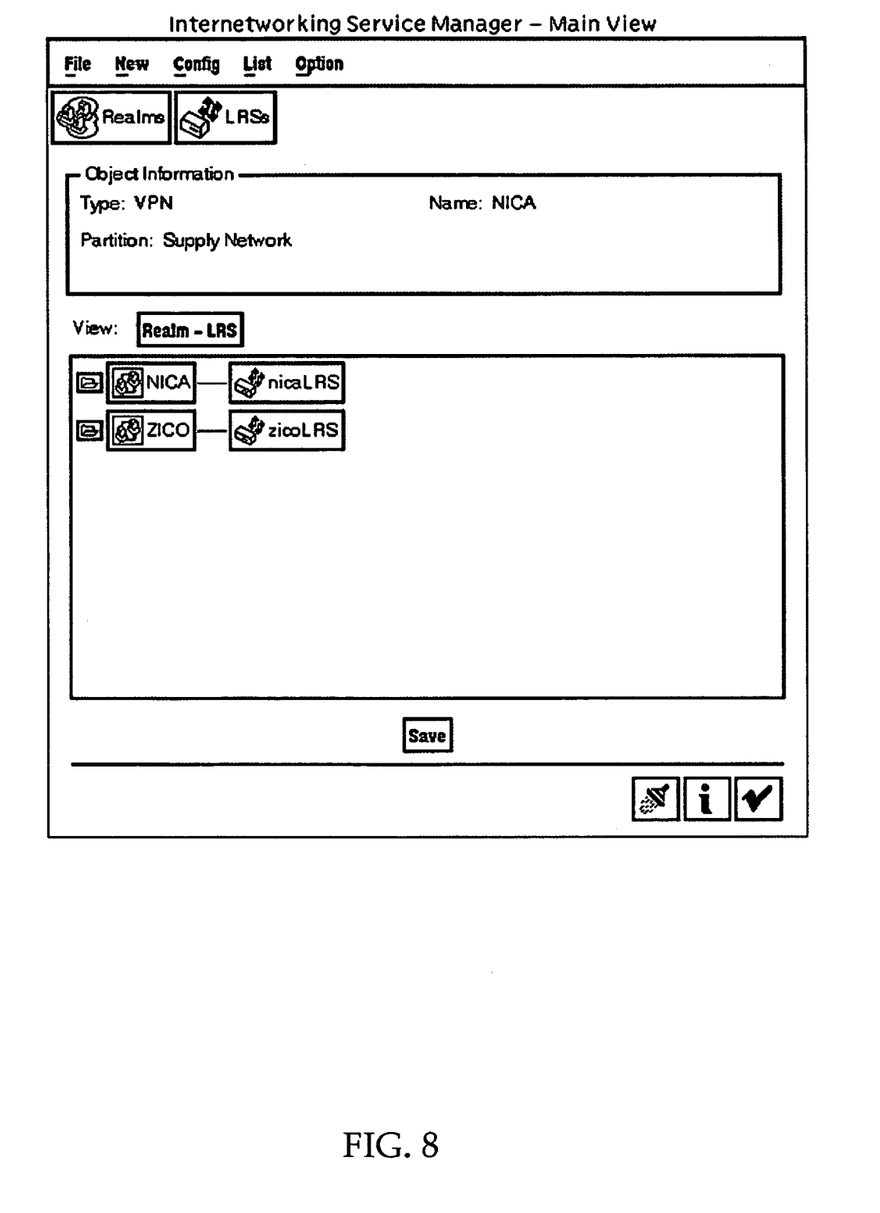
FIG. 8 is an example of the ISM GUI Customer Main View.

FIG. 8 is the GUI of the ISM for the Main View window. The window shows the Realm (VPN) to LRS (RS) binding. The act of creating a Realm and binding it to a Route Server allows one to create some internetworking service on the Route Server. The figure shows two Realm objects (NICA and ZICO) and it also shows two Route Server objects (nicaLRS and zicoLRS). The objects are bounded together and the ISM window shows this by drawing lines in between the objects.

Figure 9:
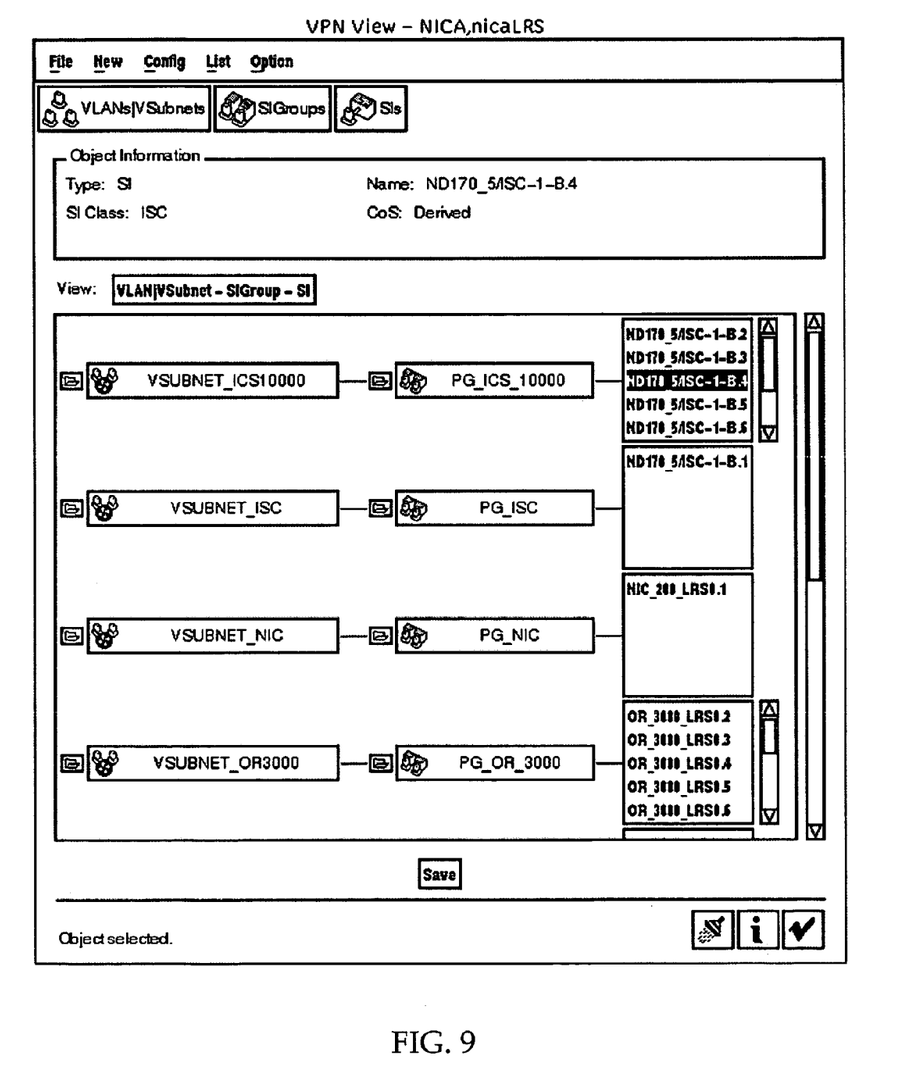
FIG. 9 is an example of the ISM GUI Customer Realm (VPN) View.

FIG. 9 is the GUI of the ISM for the VPN View window. The Customer would from FIG. 8 double click on the nicaLRS object to get to this VPN window. This window is similar to FIG. 7 showing the management object relationship model. The Customer has to bind the service objects together in order to create internetworking service for the selected VPN. The title of the window shows the selected VPN and Route Server providing the service. The main part of the window shows the relationship of the VLAN/VSubnet to SIGroup to SIs. The user of the interface can bind more objects or unbind objects to either allow or disallow services. By double clicking on the object the user can configure the object to have different networking characteristics.

Figure 10:
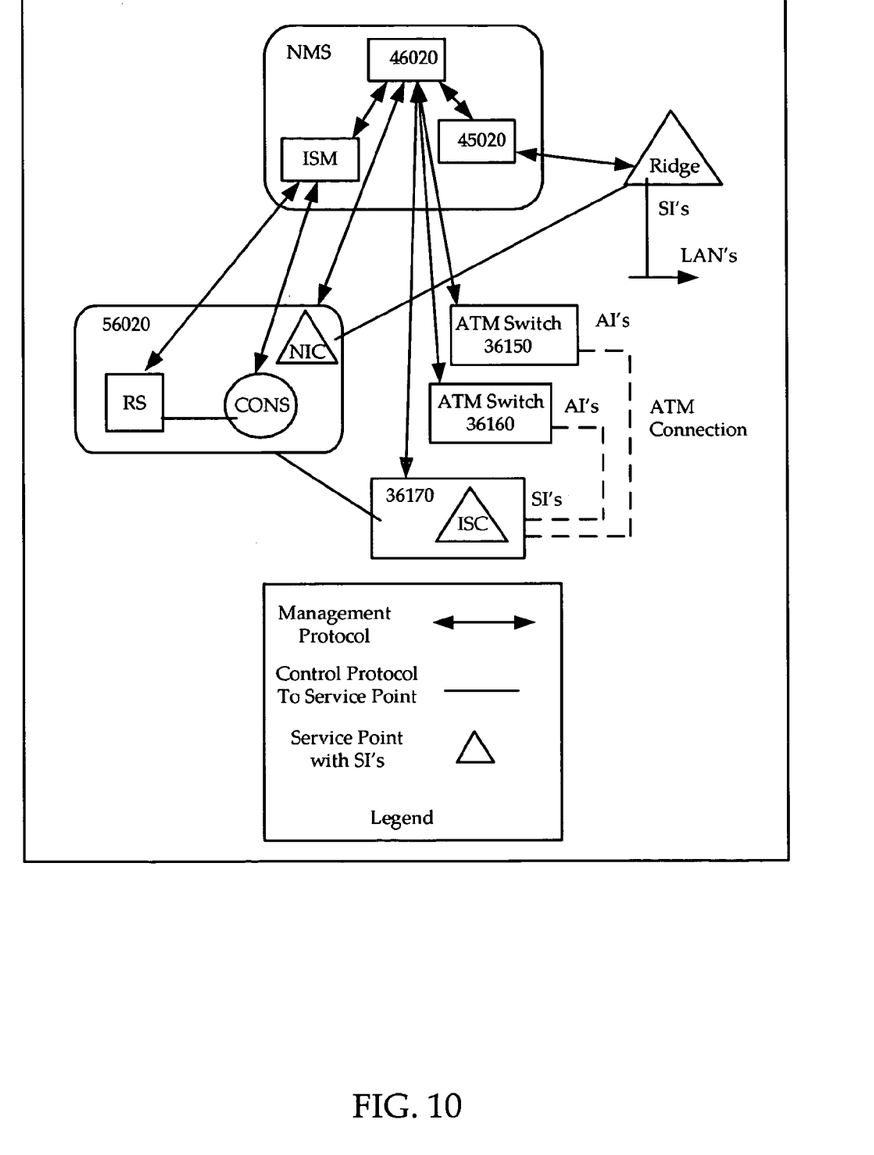
FIG. 10 is illustrates the CSI Component Dataflow for providing forwarding service connectivity.

The management infrastructure of FIG. 10 provides for IP connectivity between various CSI components especially NMSs, Route Servers, and Service Points. The connectivity is provided in-band (over the ATM fabric) and uses normally provided services. This is effected by configuring a VLAN/VSubnet-SIG-SI on some Route Server into which all managed devices will be registered and be admitted. FIG. 10 illustrates the management data flow of how the NMS provides forwarding services configuration to Service Points and Route Servers.

The CONS provides service point and Route Server state status to the NMS. Also, the CONS provides system and Realm wide configuration data to the service points and Route Servers. It provides address service of where the RS are located. It provides for RS redundancy.

The Route servers register with the CONS and await configuration information. If the information is already available then the CONS downloads the configuration to the RS. This information is provided by the ISM. The Route Servers provide an essential part of switched routing in the CSI system. Together with the Service Points, they provide routing services for the hosts and customer devices connected to the CSI system. The Route Servers within the same Realm use RS-RS links to exchange routes.

The Service points register with the CONS and are admitted. The CONS tells the Service Points to which Realm-RS they belong to and the Service points then registers with the appropriate RSs. The Route Server provides the Realm specific configuration to the Service Point.

The ISM configures data on the CONS and the RS(s) through the SNMP protocol. The CONS and RS(s) have management information base (MIB) tables to hold this data. The communication protocol varies from component to component as indicated in FIG. 10.

In the CSI System, a customer is the owner of one or more Realms. Within the 46020 a customer corresponds to a VSN. The ISM divides customer's (VSNs) equipment logically into Realms and into internetworking service objects providing a specific connectivity.

The ISM is launched from the 46020 main menu with the aid of the 46020 GUI. The following sets out the Service Provider's (Administrator) steps and behaviors of various CSI components when a network administrator desires to create a customer, and VPNs for that customer.

1) Using the 46020, the Service Provider (administrator) creates a CSI VSN which will represent the CSI customer. The ISM learns about the VSN and therefore the new Customer.
2) Using the 46020, the Service Provider (administrator) creates a Route Server object which is not partitionable (not part of a VSN) and belongs to the supply network.
3) The ISM listens to Route Server additions and contacts the CONS and learns about all the Route Servers in the network.
4) Using the ISM, the Service Provider creates a Realm (VPN) for the customer. This realm is created on the CONS.
5) Using the ISM, the Service Provider associates the Realms (VPN) to Route Servers (see FIG. 8). This action will cause the Route Servers to be partitioned to the Customer. The ISM configures the Route Servers in the network to be part of the realm.
6) Using the 46020, the Service Provider assigns the SIs and AIs to the Customer (VSN). The ISM listens to the actions and make the SIs available immediately to the user of the ISM.
7) Using the ISM, the Customer or Service Provider creates and binds the SI to SIGroups and VLAN/VSubnet/Subnet. The act of creating these objects within a Realm and Route Server scope automatically make the objects part of that Realm. The ISM configures the CONS and the RS(s) appropriately according to each of the user configuration actions. For every action 'save' in the ISM the ISM contacts the CONS and RS(s) and configures them. If the ISM cannot communicate with CONS/RS then the save is denied.
8) The ISM tells the Route Servers about the addition of service management objects and their relevant bindings.
9) The Route Servers send messages to the Service Points regarding the configuration change and connectivity is provided immediately.

The following 46020 actions will cause ISM changes which affects network connectivity:

1) When a Customer (VSN) is created in the 46020: ISM may be launched within the scope of the new VSN but there are no Realms associated to the Customer (VSN). Connectivity can be provided by configuration.
2) When a Customer (VSN) is deleted in the 46020: All ISM objects are assigned to the Supply Network (Administrator) and the SIs are automatically removed (unbound) from any SIGroups belonging to this VSN. Connectivity is removed.
3) Add SIs to VSN: The new SI are now available on the ISM to be added to SIGroups.
4) Delete SIs from VSN: The SI are unbounded from the SIGroups and connectivity is removed.
5) Add Service Point: The ISM is notified. All SIs of the new Service Point are made available to the Service Provider (Administrator) as SI unassigned to VSN. This is known as the Supply Network. The Administrator can assign those SI to a given Customer (VSN).
6) Delete Service Point: The ISM is notified. All SI's are removed from their corresponding SIGroups. Connectivity is removed.

The following is a ISM, CONS, RS(s) Interaction Example which depicts the behavior of the ISM, and specifically, a configuration that effects both CONS and RS's (VPN creation and SI binding to SIGroup's) as well as the one Service Point(ISC) to RS to realm rule. Vsubnet and VLAN creation/configuration are simple RS based operations, and are outside the scope of this example. For this example, all reference to RS implies Route Server Config.

Figure 11:
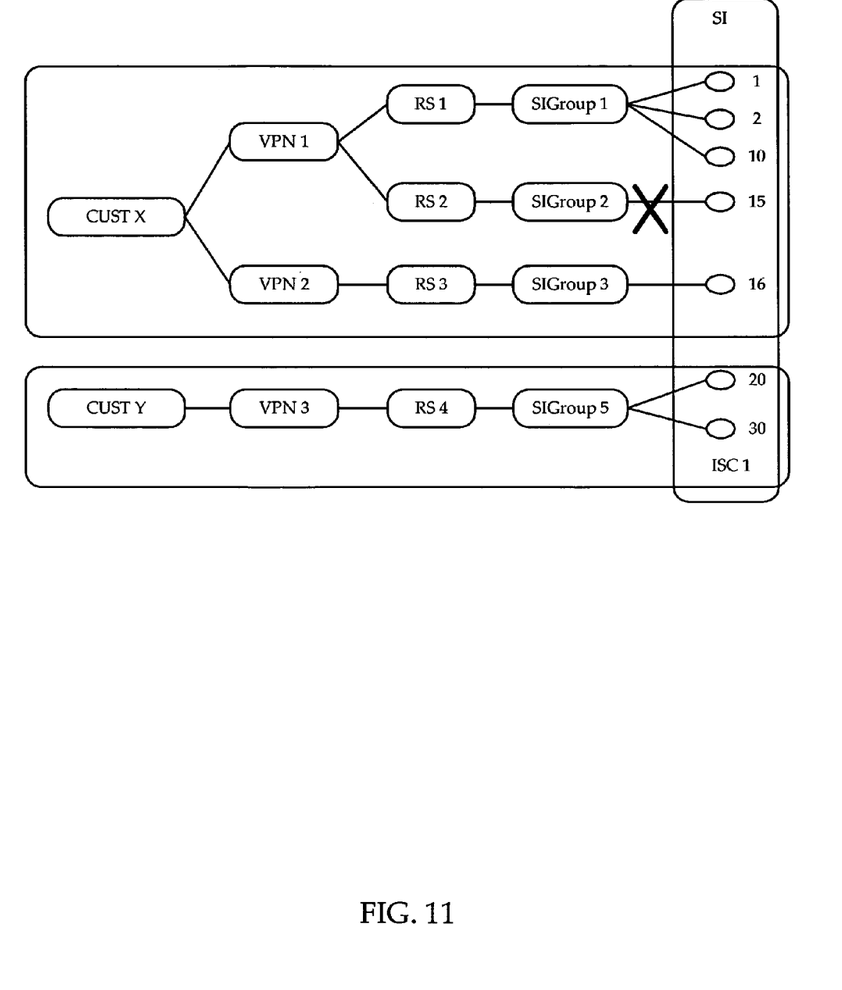
FIG. 11 is a ISM/CONS/RS interaction configuration example.

Customers X and Y are trying to achieve the configuration depicted in FIG. 11.

This is achieved as follows:

1. Admin on the 46020 partitions SIs 1,2,10, 15, 16 on ISC 1 to Customer X, then partitions SIs 20 and 30 to Customer Y.
2. Admin launches the ISM and creates 2 Realms for X (VPN1 and VPN2) and one Realm for Y (VPN3). This information is stored by the ISM on the CONS.
   Admin assigns RS1 and RS2 to VPN1, RS3 to VPN2, and RS4 to VPN3. This information is stored by the ISM on the CONS and propagated to the RS's by the ISM.
   Customer X launches the ISM, and chooses VPN1 to work on. X then chooses RS1 from the list presented (containing RS1 and RS2).
3. Customer X creates SIGroup1 on RS1. This information is stored on RS1.
4. Customer X lists available SIs. Available SIs=(Total SIs assigned to Customer from 46020)−(Bound SI's belonging to Customer from Route Servers). This list is generated by the ISM and presented to the user. This example would yield a list of ISC 1, SIs 1, 2, 10, 15, 16
5. Customer X selects ISC 1 SIs 1, 2, and 10 and attempts to drop them on to (assign them to) SIGroup1. At this point the ISM will verify that this ISC is not already assigned to a RS for the same realm. (One Service Point/RS/REALM rule). In this case, the assignment will succeed.
6. When Customer X saves the configuration, the ISM repeats the one Service Point/RS/REALM rule check before storing the assignment. This particular assignment would be stored on RS1, and then the CONS would be updated so it can tell ISC 1 to register with RS1.
7. Customer X now selects RS2, and creates SIGroup2. This information is stored on RS2.
8. Customer X now attempts to assign ISC 1 SI 15 to SIGroup2. The ISM again verifies the one Service Point/RS/REALM rule as in step 7, however this time the assignment will NOT be permitted, as ISC 1 is already configured for VPN1 on RS1. (FIG. 11 shows the 'X' on SI 15 where configuration is not allowed).
9. Customer X and Customer Y can successfully create the rest of their configuration (VLAN/VSubnet/Subnet) in a similar manner as described above.

While a particular embodiment of the invention has been described and illustrated it will be apparent that numerous changes can be introduced with departing from the basic concept. Such changes, however, will fall within the scope of the invention as defined by the appended claims.

The invention claimed is:

1. A method of restricting packet transport through a communication network to provide restricted connectivity to specific local area network (LAN) customers by administratively dividing the network utilizing internetworking service management, the method comprising:
configuring, by a service provider operating as a network administrator, a customer object for each of said specific local area network customers, each customer object having assigned thereto a portion of said network;
creating a plurality of realm objects, each realm object representing an independent forward realm;
allocating each realm object to one of the customer objects, each customer object being allocated at least one realm object;
creating a plurality of service interface (SI) objects, each SI object corresponding to a service interface;
allocating each SI object to one of the realm objects such that each realm object is allocated at least two SI objects; and
providing at least one route server for each realm object, the route server having knowledge of SI objects limited to SI objects allocated to the realm of the route server.

2. The method as defined in claim 1, wherein configuration of said customer objects and said realm objects is implemented by said network administrator via a graphical user interface.

3. The method of claim 1 further comprising:
creating a plurality of virtual network (VNET) objects; and
allocating each VNET object to one of the realm objects, each realm object being allocated at least one VNET object,
and wherein allocating each SI object to one of the realm objects comprises allocating each SI object to one of the VNET objects.

4. The method of claim 1 wherein each independent forward realm is one of: a bridged virtual private network (VPN) supporting multiple protocols, a routed virtual private network, and a public internet connectivity.

5. The method of claim 4 further comprising:
creating a plurality of virtual network (VNET) objects; and
allocating each VNET object to one of the realm objects, each realm object being allocated at least one VNET object,
and wherein allocating each SI object to one of the realm objects comprises allocating each SI object to one of the VNET objects.

6. The method of claim 5 wherein at least one independent forward realm is a bridged virtual private network supporting multiple protocols, and wherein each VNET object allocated to the bridged virtual private network represents a virtual local area network.

7. The method of claim 5 wherein at least one independent forward realm is a routed virtual private network, and wherein each VNET object allocated to the routed virtual private network represents a virtual subnet.

8. The method of claim 5 wherein at least one independent forward realm is a public internet connectivity, and wherein each VNET object allocated to the public internet connectivity represents an internet subnet.

9. A system for supporting the division of a communication network into independent forwarding objects having restricted connectivity for assignment to individual users of said network, comprising:
a network management system operated by a service provider to logically divide said network into customer objects, each customer objects having assigned thereto a portion of said divided network;
means to create a plurality of forwarding object each said forwarding objects being an independent realms which includes at least one of: a bridged virtual private network supporting multiple protocols, a routed virtual private network, and instances of public Internet access;
means to create a plurality of service interface (SI) objects, each SI object corresponding to a service interface in the communication network, and to assign each SI object to one of the forwarding objects; and
means to bind each forwarding object to one of said customer objects.

10. A The system as defined in claim 9 wherein said forwarding object is implemented by said network administrator via a graphical user interface.

11. The system as defined in claim 9 wherein said network management system includes a network manager, an element manager and an internetworking service manager.

12. The system as defined in claim 9 wherein said network management system (NMS) is controlled by said service provider to divide said network into a plurality of independent realms.

13. A The system as defined in claim 9 wherein said communication network is a local area network emulation (LANE) network.

* * * * *